United States Patent
Li et al.

(10) Patent No.: US 9,560,492 B2
(45) Date of Patent: Jan. 31, 2017

(54) METHOD FOR ALLOCATING IDENTIFICATION, METHOD FOR PAGING GROUP, AND COMMUNICATION DEVICE

(71) Applicant: Huawei Technologies Co., Ltd., Shenzhen, Guangdong (CN)

(72) Inventors: Yue Li, Shenzhen (CN); Yongjun Liu, Shenzhen (CN); Zhenxing Hu, Shenzhen (CN); Zhisong Bie, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 586 days.

(21) Appl. No.: 13/973,673

(22) Filed: Aug. 22, 2013

(65) Prior Publication Data

US 2013/0344903 A1    Dec. 26, 2013

Related U.S. Application Data

(63) Continuation of application No. PCT/CN2012/070838, filed on Feb. 2, 2012.

(30) Foreign Application Priority Data

Feb. 22, 2011 (CN) .......................... 2011 1 0042488

(51) Int. Cl.
*H04W 68/00* (2009.01)
*H04W 4/08* (2009.01)
(Continued)

(52) U.S. Cl.
CPC .............. *H04W 4/08* (2013.01); *H04W 4/005* (2013.01); *H04W 68/025* (2013.01); *H04W 68/005* (2013.01)

(58) Field of Classification Search
CPC .......................... H04W 68/02; H04W 68/005
(Continued)

(56) References Cited

U.S. PATENT DOCUMENTS

2007/0281724 A1  12/2007  Isobe et al.
2008/0057928 A1  3/2008  Achter et al.
(Continued)

FOREIGN PATENT DOCUMENTS

CN    1859637 A    11/2006
CN    1941931 A    4/2007
(Continued)

OTHER PUBLICATIONS

"3GPP TS 23.060—3$^{rd}$ Generation Partnership Project; Technical Specification Group Services and System Aspects; General Packet Radio Service (GPRS); Service description; Stage 2 (Release 10)," Version 10.2.0, 3$^{rd}$ Generation Partnership Project, Valbonne, France (Dec. 2010).

(Continued)

*Primary Examiner* — Omoniyi Obayanju
(74) *Attorney, Agent, or Firm* — Leydig, Voit & Mayer, Ltd.

(57) ABSTRACT

A method for allocating an identification using an access network grouping scheme, and a method and apparatus for paging group are described. The ID allocating method comprises: receiving a group ID of a group of group-paged objects allocated by a core network device for a terminal device, wherein the group of group-paged objects comprises one or more subgroups; allocating a device ID or a user ID to the terminal device, wherein the device ID or the user ID comprises information of a subgroup ID of a subgroup to which the terminal device belongs; and sending the allocated device ID or user ID to the terminal device. The number of (Continued)

terminals in the subgroup is appropriate, and the resources are allocated more flexibly and reasonably.

16 Claims, 6 Drawing Sheets

(51) Int. Cl.
*H04W 4/00* (2009.01)
*H04W 68/02* (2009.01)

(58) Field of Classification Search
USPC .......................................................... 455/458
See application file for complete search history.

(56) References Cited

U.S. PATENT DOCUMENTS

| 2008/0188247 | A1* | 8/2008 | Worrall | H04W 68/025 |
| | | | | 455/458 |
| 2009/0238356 | A1 | 9/2009 | Kojo et al. | |
| 2011/0312347 | A1* | 12/2011 | Dinan | H04W 68/02 |
| | | | | 455/458 |

FOREIGN PATENT DOCUMENTS

| CN | 101102524 A | 1/2008 |
| CN | 101137115 A | 3/2008 |
| CN | 101540959 A | 9/2009 |
| WO | WO 0131964 A1 | 5/2001 |
| WO | WO 2011087826 A1 | 7/2011 |
| WO | WO 2011100497 A1 | 8/2011 |

OTHER PUBLICATIONS

"3GPP TS 23.401—$3^{rd}$ Generation Partnership Project; Technical Specification Group Services and System Aspects; General Packet Radio Service (GPRS) enhancements for Evolved Universal Terrestrial Radio Access Network (E-UTRAN) access (Release 10)," Version 10.2.1, $3^{rd}$ Generation Partnership Project, Valbonne, France (Jan. 2011).

Yao et al., "Expansion strategy based on three paging HMIPv6," China Academic Journal Electronic Publishing House (2004).

"3GPP TSG RAN WG2 #32—RAN specific Group ID for MBMS," document R2-022610, agenda item 10.2.1, $3^{rd}$ Generation Partnership Project, Valbonne, France (Sep. 2002).

International Search Report in corresponding PCT Patent Application No. PCT/CN2012/070838 (May 3, 2012).

"Paging and downlink transmission for MTC," 3GPP TSG WG2 Meeting #70, Montreal, Canada, R2-102781, $3^{rd}$ Generation Partnership Project, Valbonne, France (May 10-14, 2010).

"Pull based RAN overload control," 3GPP TSG-RAN WG2 Meeting #70, Madrid, Spain, R2-104870, $3^{rd}$ Generation Partnership Project, Valbonne, France (Aug. 23-27, 2010).

"Group paging for MTC devices," 3GPP TSG-RAN2 Meeting #70bis, Stockholm, Sweden, R2-104004, $3^{rd}$ Generation Partnership Project, Valbonne, France (Jun. 28-Jul. 2, 2010).

"RAN Mechanisms to Distribute RACH Intensity," 3GPP TSG RAN WG2 #69, San Francisco, USA, R2-102297, $3^{rd}$ Generation Partnership Project, Valbonne, France (Jan. 22-26, 2010).

\* cited by examiner

US 9,560,492 B2

METHOD FOR ALLOCATING IDENTIFICATION, METHOD FOR PAGING GROUP, AND COMMUNICATION DEVICE

CROSS-REFERENCE TO RELATED APPLICATIONS

This application is a continuation of International Patent Application No. PCT/CN2012/070838, filed on Feb. 2, 2012, which claims priority to Chinese Patent Application No. 201110042488.0, filed on Feb. 22, 2011, both of which are hereby incorporated by reference in their entireties.

TECHNICAL FIELD

The embodiments of this invention relate to the field of mobile communications, and particularly, to a method for allocating an identification using an access network grouping scheme, a method for paging group, and corresponding communication device.

BACKGROUND

With the development of the communication technologies, the M2M technology is gradually formed and rapidly developed. In brief, the M2M refers to transmitting data from one terminal to another terminal, i.e., a machine to machine interaction. But in a broad sense, the M2M may represent machine to machine, man to machine, machine to man, and mobile to machine connections and communications, and it covers all technologies and means for establishing communication connections between man, machine and system.

The application market of the M2M is quickly increasing all over the world. With the deepening of related technologies of communication device, management software, etc. and the decrease of the M2M product cost, the M2M service will gradually be mature. At present, the M2M has been applied to the fields such as safety monitoring, mechanical service, repairing service, vending machine, public transport system, fleet management, industrial process automation, motor machine and city informatization.

Generally, the M2M applications have various characteristics, wherein one type of very important characteristic is that many M2M applications have characteristics based on groups, and the communications having such group characteristics also include the following typical characteristics:
  a large number of terminals;
  a low mobility: the terminal does not move or just moves within a certain range;
  the major service is the Mobile Terminated (MT) service;
  if an MT service appears, a large number of terminals shall be simultaneously paged;
the terminal shall make a subsequent response after receiving a paging message.

Since the existed cellular network is mainly designed and optimized for the Human to Human (H2H) services such as voice, short message, etc., and the M2M has a large number of terminals, problems such as network congestion will easily be caused if a lot of M2M devices access the network.

Many organizations, such as the 3rd Generation Partnership Project (3GPP), have started to perform optimizations for the characteristics of the M2M applications, and proposed quite a few group paging solutions since most of the M2M applications have the group characteristics. The basic idea of group paging is that one group of device terminals share a group ID, and during paging, the group of device terminals are paged by carrying the group ID in the paging message. The corresponding paging is an individual paging which pages one device terminal.

For a paging of the MT service having the M2M group characteristics, the core network replaces the traditional individual paging with the group paging. First of all, the group ID is allocated. If a terminal device starts up and logins, the core network allocates a group ID to the terminal device according to the subscription data thereof; the group ID belongs to the core network hierarchy and the Non-Access Stratum (NAS), and it is also stored in the terminal device. Next, a group paging is carried out according to the allocated group ID. During group paging, the core network initiates a group paging request for devices having certain group characteristics in a certain paging area, wherein the group paging request includes the group ID of the group of devices; after receiving the group paging request, the access network directly uses the provided group ID of the core network to perform a group paging of all the devices of such type in the effective range. The paging area can be referred to as Routing Area (RA) in the Universal Mobile Telecommunications System (UMTS), and Tracking Area (TA) in the Long Term Evolution (LTE) system.

As can be seen from the above analysis, the grouping is only carried out in the core network rather than the access network. The group ID is "transparently transmitted" in relation to the access network, i.e., for the access network, the group paging and the individual paging have no difference, and its function is to package the paging request into a paging message and send it out, regardless of whether the message is sent for a group of devices or an individual device, and such information is only acquired by the device(s) per se and the core network.

Since the grouping strategy is only performed in the core network (CN) hierarchy, grouping is no longer carried out in the Radio Access Network (RAN). In relation to the access network, the core network cannot better acquire the distribution condition of the terminal devices, and even in the same paging area, the numbers of terminals contained in various cells of the access network may be quite different from each other. Thus, if the grouping is only carried out using the core network, the grouping may be unreasonable, e.g., too many terminals are existed in certain cells, which is adverse to the subsequent optimization of the group paging response.

SUMMARY

A plurality of aspects of the present invention provide a method for allocating an identification using an access network grouping scheme, a method for paging group, and corresponding communication device, so as to overcome the above problem.

One aspect of the present invention provides a method for allocating an identification, comprising: receiving a group ID of a group of group-paged objects allocated by a core network device for a terminal device, wherein the group of group-paged objects comprises one or more subgroups; allocating a device ID or a user ID to the terminal device, wherein the device ID or the user ID comprises information of a subgroup ID of a subgroup to which the terminal device belongs; and sending the allocated device ID or user ID to the terminal device.

Another aspect of the present invention provides a method for paging group, comprising: receiving a group paging request from a core network device, wherein the group paging request comprises a group ID of a group of group-paged objects; determining the number of terminal devices belonging to the group of group-paged objects in a cell supported by an access network device, according to the group ID; grouping the terminal devices into one or more subgroups according to the number of the terminal devices; determining a subgroup ID of each subgroup; generating a group paging message carrying the subgroup ID; and sending the group paging message.

Another aspect of the present invention provides a method for paging group, comprising: monitoring a paging channel to receive a group paging message generated by an access network device, wherein the group paging message carries a subgroup identification (ID) determined by the access network device; obtaining the subgroup ID from the group paging message; determining whether the subgroup ID is matched with a pre-stored device ID or user ID; and responding to the group paging message if the subgroup ID is matched with the device ID or the user ID.

Another aspect of the present invention provides a communication device, comprising: an ID receiving unit configured to receive a group ID of a group of group-paged objects allocated to a terminal device by a core network device, wherein the group of group-paged objects comprises one or more subgroups; an ID allocating unit configured to allocate a device ID or a user ID to the terminal device, wherein the device ID or the user ID comprises information of a subgroup ID of a subgroup to which the terminal device belongs; and an ID sending unit configured to send the allocated device ID or user ID to the terminal device.

Another aspect of the present invention provides a communication device, comprising: a request receiving unit configured to receive a group paging request from a core network device, wherein the group paging request comprises a group identification (ID) of a group of group-paged objects; a number determining unit configured to determine the number of terminal devices belonging to the group of group-paged objects in a cell supported by an access network device, according to the group ID; a grouping unit configured to group the terminal devices into one or more subgroups according to the number of the terminal devices; an ID determining unit configured to determine a subgroup ID of each subgroup; a message unit configured to generate a group paging message carrying the subgroup ID; and a sending unit configured to send the group paging message.

Another aspect of the present invention provides a communication device, comprising: a monitoring unit configured to monitor a paging channel to receive a group paging message generated by an access network device, wherein the group paging message carries a subgroup ID determined by the access network device; an obtaining unit configured to obtain the subgroup ID from the group paging message; a matching unit configured to determine whether the subgroup ID is matched with a pre-stored device ID or user ID; and a responding unit configured to respond to the group paging message if the subgroup ID is matched with the device ID or the user ID.

In the embodiment of the present invention, through the hierarchical grouping, not only a grouping is carried out in the core network hierarchy, but also the terminals in each cell are further grouped in the access network hierarchy, so that the number of terminals in the subgroup is appropriate, the resources are allocated more flexibly and reasonably, and the improved group paging response solution is more effective.

BRIEF DESCRIPTION OF DRAWINGS

In order to more clearly describe the technical solutions of the embodiments of the present invention, the drawings to be used in the descriptions of the embodiments or the prior art are briefly introduced as follows. Obviously, the following drawings just illustrate some embodiments of the present invention, and a person skilled in the art can obtain other drawings from these drawings without paying any creative effort.

DESCRIPTION OF EMBODIMENTS

The technical solutions in the embodiments of the present invention will be clearly and completely described as follows with reference to the drawings in the embodiments of the present invention. Obviously, those described herein are just parts of the embodiments of the present invention rather than all the embodiments. Based on the embodiments of the present invention, any other embodiment obtained by a person skilled in the art without paying any creative effort shall fall within the protection scope of the present invention.

Figure 1:
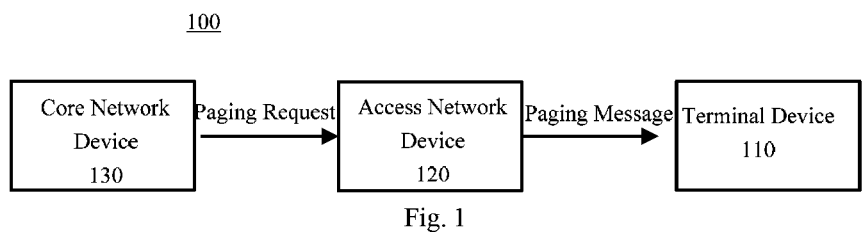
FIG. 1 is a schematic diagram which illustrates a communication system applicable to an embodiment of the present invention.

FIG. 1 is a schematic diagram which illustrates a communication system 100 applicable to an embodiment of the present invention. The communication system 100 includes a terminal device 110, an access network device 120 and a core network device 130. To be noted, although FIG. 1 only illustrates one terminal device 110, the embodiment of the present invention is not limited thereto. The terminal device 110 may be a large number of Machine Type Communication (MTC) devices which support the M2M communication. If carrying out a group paging, the core network device 130 may send a paging request (group paging request) to multiple terminal devices 110, and then the access network device 120 sends corresponding paging message (group paging message) to the terminal device 110 in each cell.

The access network device 120 may be a device of the base station system, e.g., an eNB in the LTE, a NodeB in the UMTS, a Base Transceiver Station (BTS) or a Base Station Controller (BSC) in the GSM, etc.

Firstly, in the process where a terminal device 110 starts up and logins, the core network device 130 allocates a group ID of core network hierarchy, i.e., CNGroupID, to the terminal device 110 according to subscription data thereof (service characteristics, etc.). On the basis that the core network device 130 groups the terminal devices 110, the embodiment of the present invention further allocates device IDs or user IDs to the terminal devices 110 through the access network device 120, wherein the device IDs or the user IDs may include subgroup IDs of the subgroups, so that the access network device 120 adaptively classifies the terminal devices 110 into subgroups.

Figure 2:
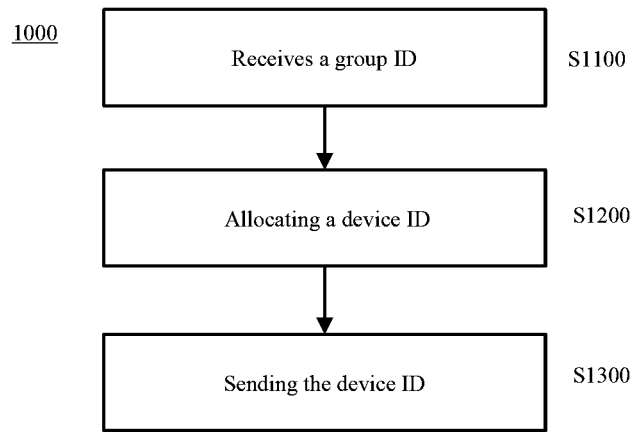
FIG. 2 is a schematic flow diagram which illustrates a method for allocating an identification according to an embodiment of the present invention.

FIG. 2 is a schematic flow diagram which illustrates a method for allocating an identification 1000 according to an embodiment of the present invention. The method 1000 is executed by the access network device 120 in a process where the terminal device 110 starts up and logins.

As illustrated in FIG. 2, in S1100 of method 1000, the access network device 120 receives a group ID CNGroupID of a group of group-paged objects allocated by the core network device 130 to the terminal device 110. The group of group-paged objects is a group to be paged by the core network device 130, and it may include one or more subgroups. In other words, the access network device 120 may construct one or more subgroups with some terminal devices 110 in the group of group-paged objects.

Next in S1200, allocating device IDs or user IDs to the terminal devices 110 (e.g., the device ID and the user ID may be collectively referred to as RANDeviceID). A device ID or a user ID RANDeviceID may include information of a subgroup ID RANGroupID of a subgroup to which the terminal device 110 belongs. The method for constructing and allocating the device ID or the user ID RANDeviceID will be detailedly described later. To be noted, according to the embodiment of the present invention, the RANDeviceID may be an individually allocated ID, or other device ID or user ID based on the terminal or user, such as International Mobile Subscriber Identification Number (IMEI), Mobile Subscriber International ISDN/PSTN Number (MSISDN), International Mobile Subscriber Identity (IMSI), Temporary Mobile Subscriber Identity (TMSI), etc. Next, an individually allocated "device ID RANDeviceID" will be taken as an example to describe the concept of the embodiment of the present invention, but the embodiment of the present invention is not limited thereto, and the RANDeviceID may be generated or allocated based on other type of device ID or user ID, provided that it uniquely identifies the terminal device 110.

After the device ID RANDeviceID is allocated, in S1300, the access network device 120 sends the allocated device ID RANDeviceID to the terminal devices 110.

Thus, in the embodiment of the present invention, through the hierarchical grouping, not only a grouping is carried out in the core network hierarchy, but also the terminals in each cell are further grouped in the access network hierarchy, so that the number of terminals in the subgroup is appropriate, the resources are allocated more flexibly and reasonably, and the improved group paging response solution is more effective.

According to an embodiment of the present invention, the RANGroupID and the RANDeviceID may be named using the following strategy, so that the RANDeviceID can include the information of the RANGroupID.

In which, the RANGroupID and the RANDeviceID have the same length, but the RANGroupID uses special values, e.g., the last several bits are all 0, or other specific bits are 0. In addition, the RANDeviceID identifying an individual device shall not be the same as the subgroup ID RANGroupID. Meanwhile, the RANGroupID of the subgroup to which the device belongs shall be obtained from the RANDeviceID of the device. Thus, the terminal device 110 only needs to store the RANDeviceID of the device.

The benefit of this manner is that no extra information is required to indicate whether a certain ID is a group ID, or indicate a group to which a certain device ID belongs. In that case, the terminal device 110 acquires the ID allocation strategy, i.e., it has the function of identifying the ID.

Further, the RANDeviceID may also include the CNGroupID, e.g., the CNGroupID may be mapped to some corresponding bits of the RANDeviceID. The access network device 120 stores information of the mapping relation, and even if the device is in an idle state, the group context is also stored rather than being released. In order that the device terminal conveniently calculates the paging timing of the group to which it belongs, the CNGroupID may also be sent to the terminal device 110 for a storage.

For example, assuming that the RANDeviceID and the RANGroupID are represented with 32 bits, wherein the first eight bits correspond to a certain CNGroupID, the second eight bits represent a cell ID (cell number) within the RAN range, and then every m (m can exactly divide 16) bits is taken as a hierarchy of subgroup. After the anterior 16 bits are determined, all the possible subgroup IDs RANGroupIDs are obtained as follows:

For a subgroup of the first hierarchy, for example m=4, the paging group RANGroupID of the first subgroup is xxxx xxxx xxxx xxxx 0000 0000 0000 0000, the paging group RANGroupID of the second subgroup is xxxx xxxx xxxx xxxx 0001 0000 0000 0000, and so on. The subgroup ID is determined by the first m-bit group following the 16 bits, and the bits later are all 0.

For a subgroup of the second hierarchy, for example m=4, the RANGroupID of the first subgroup is xxxx xxxx xxxx xxxx xxxx 0000 0000 0000, the RANGroupID of the second subgroup is xxxx xxxx xxxx xxxx xxxx 0001 0000 0000, and so on. The subgroup ID is determined by the second m-bit group following the 16 bits, and the bits later are all 0.

For a subgroup of the kth hierarchy, the subgroup ID is determined by the kth m-bit group following the 16 bits, and the bits later are all 0.

After all the possible RANGroupIDs are obtained, the rest values may be taken as the device IDs (RANDeviceIDs) of the terminal devices 110, and sorted in the order of size to form a list of available device IDs. The bits other than those representing the CNGroupID, the cell ID and the subgroup ID constitute the specific ID of the terminal device 110. The device ID of the terminal device 110 is determined by mapping the group ID, the cell ID, the subgroup ID and the specific ID, respectively. According to the above method, the maximum number of the available device IDs is (216-216-$m$). For example m=4, the maximum number is 61440.

If the terminal devices 110 start up and login, the access network device 120 can orderly take out the IDs from the list of available device IDs according to a certain rule or simply the login order, and allocates them to the terminal devices 110, wherein the IDs having been allocated shall be deleted from the list. Of course, the access network device 120 can also randomly allocate the RANDeviceIDs. The device IDs may be recovered after the terminal devices 110 shut down.

In practical implementation, m may be determined upon demand. For example, in order to achieve a smaller granularity, m may be a smaller value such as 2. Because if m=4 and the device IDs are allocated in the login order, the number of IDs in the subgroup (RANDeviceIDs) may be 15, 240, . . . , 24×k−24×(k−1), and the interval is too large, which may cause some problems in the practical grouping.

In addition, it needs to consider the number of bits required for mapping the CNGroupID, and the number of bits required for mapping the cell number in the RAN (RNC or eNB). For example, in the LTE, the eNB governs 3 cells, and only 2 bits are required.

According to the above strategy, one device ID RANDeviceID may include information of one or more possible subgroup IDs RANGroupIDs. For example, if m is 4, the device ID RANDeviceID of one terminal device 110 is xxxx xxxx xxxx xxxx 0001 0100 yyyy yyyy. The anterior 8 bits may represent the group ID CNGroupID, the subsequent 8 bits may represent the cell ID, and the final 16 bits may represent the specific ID of the terminal device 110. In that case, the terminal device 110 may be classified into the subgroup xxxx xxxx xxxx xxxx 0001 0000 0000 0000 or xxxx xxxx xxxx xxxx 0000 0010 0000 0000.

In addition, during the process of startup and login, the core network device 130 further allocates corresponding TMSI for core network individual paging, such as Packet-TMSI (P-TMSI) or S-TMSI. The identifications CNGroupID and TMSI will be sent to the access network device 120, which requests the subscription data from the core network device 130 through those identifications. In addition, the access network device 120 can send the identifications CNGroupID and TMSI to the terminal device 110 for a storage. Thus, the access network device 120 acquires related information of the terminal device 110 in the cell supported by the access network device 120.

If the CNGroupID is included in the RANDeviceID of the device according to the above strategy, it only requires sending the RANDeviceID to the terminal device 110.

Figure 3:
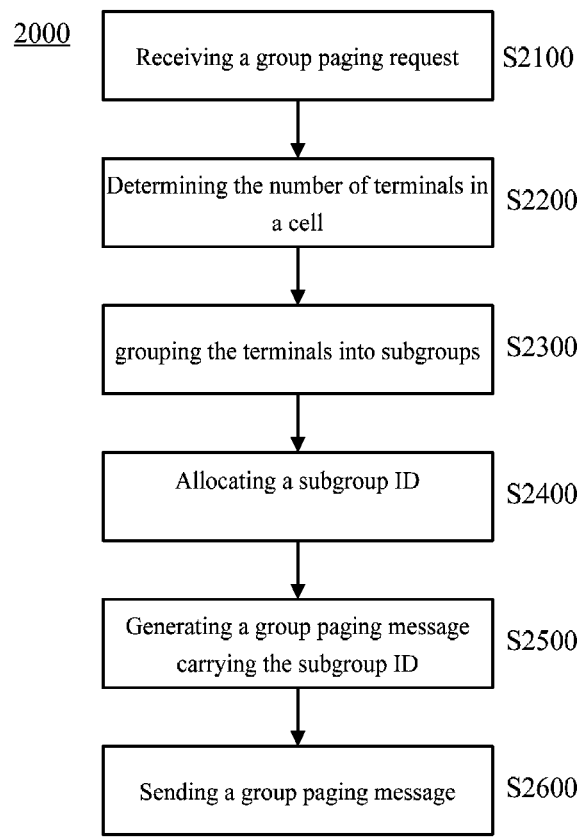
FIG. 3 is a schematic flow diagram which illustrates a method for paging group executed by an access network device according to an embodiment of the present invention.

Next, the access network device 120 can adaptively group the subgroups in the group paging process according to the ID allocation strategy. FIG. 3 is a schematic flow diagram which illustrates a method for paging group 2000 executed by an access network device 120 according to an embodiment of the present invention.

In S2100 of the method 2000, the access network device 120 receives from the core network device 130 a group paging request including a group ID CNGroupID of a group of group-paged objects. The group of group-paged objects is a group to be paged by the core network device 130.

In S2200, the access network device 120 may determine the number of terminal devices 110 belonging to the group of group-paged objects in a cell supported by the access network device 120, according to the CNGroupIDs in the group paging request. The access network device 120 may acquire information of the terminal devices 110 in the startup and login stage of the terminal devices 110 in the cell, so as to determine the number of terminal devices 110 belonging to the group of group-paged objects in the cell.

Next in S2300 of the method 2000, the access network device 120 may further group the terminal devices 110 (subgroup classification). For example, the access network device 120 classifies the terminal devices 110 into one or more subgroups according to the number thereof, and determines the subgroup ID RANGroupID of each subgroup in S2400. The strategy for grouping the subgroups and determining the subgroup IDs will be further detailedly described as follows. The terminal devices 110 in each subgroup can share one connection. Thus, the terminal devices may be further grouped in the access network hierarchy according to the distribution condition of the terminal devices in the cell, so as to adaptively adjust the subgroups according to a certain strategy in the access network, thereby optimizing the subsequent group paging response.

Next, the access network device 120 generates a group paging message which carries subgroup ID in S2500 of the method 2000, and sends the group paging message to the terminal devices 110 in S2600.

In the embodiment of the present invention, through the hierarchical grouping, not only a grouping is carried out in the core network hierarchy, but also the terminals in each cell are further grouped in the access network hierarchy, so that the number of terminals in the subgroup is appropriate, the resources are allocated more flexibly and reasonably, and the improved group paging response solution is more effective.

Figure 4:
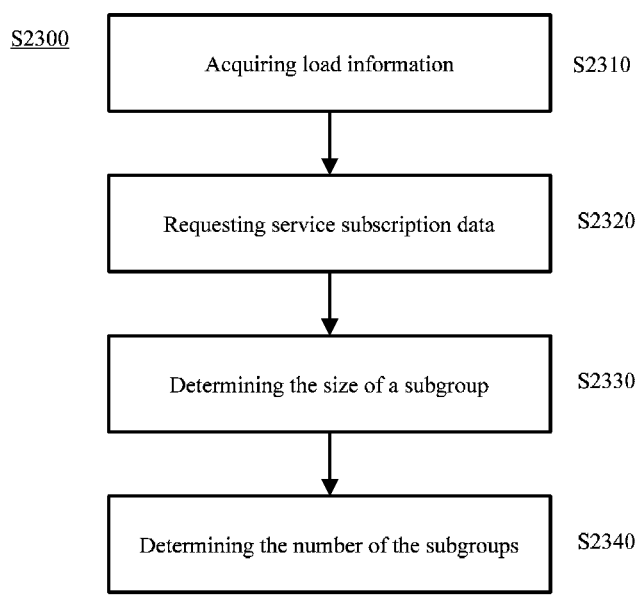
FIG. 4 is a schematic flow diagram which illustrates an example of a subgroup classification according to an embodiment of the present invention.

In S2300 of FIG. 3, the access network device 120 in the embodiment of the present invention may group the terminal devices 110 in the cell into subgroups according to a predetermined grouping strategy. FIG. 4 is a schematic flow diagram which illustrates an example of a subgroup classification according to an embodiment of the present invention.

As illustrated in FIG. 4, in S2310, the access network device 120 acquires load data of the cell. The load data is some parameter data corresponding to a certain load condition if the existing connection in the cell has occupied certain communication resources such as time-frequency resources. S2310 may be performed through an existing load prediction function, so that the access network acquires the load condition of the cell at present. For example, according to an embodiment of the present invention, the following load data if the cell is under different load conditions can be obtained through tests: a time Tsetup for the MTC device 110 to set up a connection (including signaling connection and radio bearer connection), the time Tdata for completing a service data transmission, the number of connections Nconn that can be simultaneously supported, etc.

Next, in S2320, the access network device 120 requests the service subscription data from the core network device 130 according to the group ID CNGroupID. The service subscription data includes the QoS data of the service. For example, according to an embodiment of the present invention, the maximum time delay $T_{max}$ required by the service can be obtained at that time.

After obtaining the load data and the service subscription data, the access network device 120 can determine the subgroup size according to those data in S2330. In other words, the access network device 120 can determine the maximum number of the devices 110 included in each subgroup. For example, according to an embodiment of the present invention, if one connection is shared in one subgroup, the maximum number of the terminal devices 110 in one subgroup is [(Tmax−Tsetup)/Tdata] (rounded down) if the access network carries out a group paging under different load conditions. Those corresponding relations may be stored in the access network device 120, and utilized by the access network if a group paging of the subgroups is performed.

After obtaining the maximum number of the devices included in each subgroup, in S2340, the access network device 120 may determine the number of the subgroups with reference to the known number of devices belonging to the CNGroupID in the present cell.

In order to better utilize the resources, if the total number of the devices is given, the number of the subgroups and the number of the devices in each subgroup can also be adaptively adjusted according to the actual conditions.

According to the embodiment of the present invention, the access network device 120 can determine and adjust the grouping mode of the subgroups of the terminal devices 110 in the cell according to the load conditions and the service quality requirement of the cell. Of course, the access network grouping solution in the embodiment of the present invention can also employs other factors upon demand.

After the size and number of the subgroups are determined, corresponding subgroup IDs RANGroupIDs to be used may be determined from the device IDs RANDeviceIDs. According to the previously described strategy, the device IDs RANDeviceIDs include the ID information of the subgroups into which the devices 110 may be classified, thus the subgroup ID of corresponding subgroup can be selected and determined according to the determined size and number of the subgroups. For example, if the above device xxxx xxxx xxxx xxxx 0001 0100 yyyy yyyy needs to be classified into the first hierarchy (m=4), then the ID of corresponding subgroup shall be xxxx xxxx xxxx xxxx 0001 0000 0000 0000.

Still taking the LTE as an example: if determining the grouping mode of the subgroups, assuming that the number of a group of MTC devices 110 in one TA is 3000, the devices are uniformly distributed, the TA includes 10 eNBs each having 3 cells, then each cell includes 100 such type of MTC devices 110. Assuming that under the normal load, it is determined, in S2310 and S2320 of FIG. 3, that Tsetup=0.5 s, Tdata=1 s, Tmax=1 min and Nconn=5. If the paging method according to the embodiment of the present invention is used, i.e., one group of devices share one connection, the number of the group of devices shall not exceed $(60-0.5)/1 \approx 59$. Thus, at the eNB (i.e., the access network device 120), it may be selected to group such type of MTC devices 110 in one cell into two subgroups each having 50 MTC devices 110. If the RANGroupID and the RANDeviceID including the RANGroupID information are used, assuming that m=4, the number of devices in the subgroup may be 15, 240, . . . . If the subgroup having 15 devices is used, then 100 devices require 7 subgroups, which is larger than the Nconn. If the subgroup having 240 devices is used, there is only one subgroup, which is also inappropriate.

If m=2, the number of devices in the subgroup may be 3, 12, 48, . . . , $22 \times k - 22 \times (k-1)$. Thus 100 devices may be classified into 3 subgroups, wherein the first two subgroups each has 48 devices, and the last subgroup has 2 devices. The RANGroupID may be xxxx xxxx xxxx xxxx xxxx 0000 0100 0000, xxxx xxxx xxxx xxxx xxxx 0000 1000 0000, and xxxx xxxx xxxx xxxx xxxx 0000 1100 0000, respectively.

Of course, the RANDeviceID may have a naming rule different from the RANGroupID. In that case, after corresponding subgroup ID RANGroupID (it can be combined with the CNGroupID) is allocated to each subgroup, corresponding RANDeviceID is allocated to each terminal device 110 in the subgroup. At that time, both the RANGroupID and the RANDeviceID shall be sent to the terminal device 110 for a storage. The corresponding relation between the RANGroupID and the RANDeviceID is stored in the access network device 120 and the terminal device 110.

Thus, in the grouping method according to the embodiment of the present invention, through the hierarchical grouping, a grouping further is carried out in the access network hierarchy, and the size and number of subgroups are adaptively adjusted during the group paging, so that the number of terminals in the subgroup is appropriate, the resources are allocated more flexibly and reasonably, and the improved group paging response solution is more effective.

Figure 5:
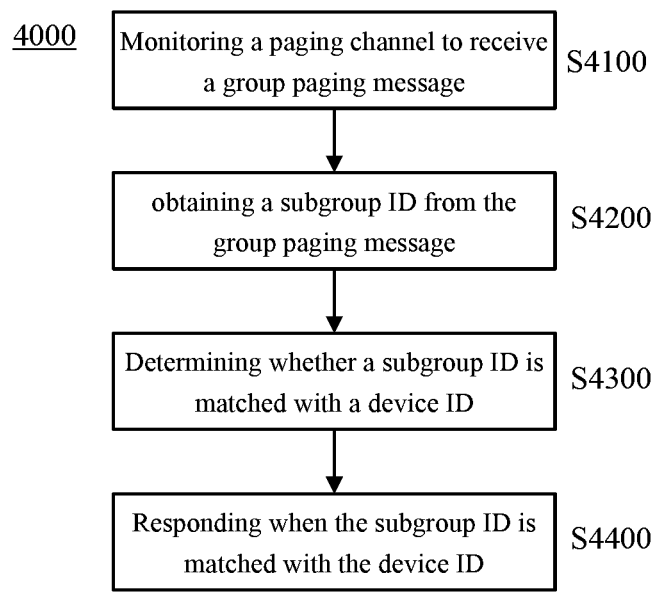
FIG. 5 is a schematic flow diagram which illustrates a method for paging group executed by a terminal device according to an embodiment of the present invention.

The method for paging group where the access network device 120 adopts the adaptive grouping solution is described as above. Accordingly, the terminal device 110 adopts corresponding response strategy. FIG. 5 is a schematic flow diagram which illustrates a method for paging group 4000 executed by a terminal device 110 according to an embodiment of the present invention.

As illustrated in FIG. 5, in S4100, the terminal device 110 monitors a paging channel to receive a group paging message generated by the access network device 120, wherein the group paging message carries the subgroup ID RANGroupID determined by the access network device 120. As mentioned above, during the previous processing, the terminal device 110 has acquired the subgroup ID RANGroupID or the device ID RANDeviceID allocated by the access network device 120. As recited before, the device ID RANDeviceID may include information of the RANGroupID, and in that case, the terminal device 110 only needs to pre-store the RANDeviceID. Alternatively, the terminal devices 110 may store their respective RANGroupIDs and RANDeviceIDs thereof, and acquire the corresponding relations therebetween. The access network device 120 may determine the subgroup ID according to the method as illustrated in FIG. 3.

Next, in S4200, the terminal device 110 obtains a subgroup ID RANGroupID from the group paging message. In S4300, the terminal device 110 determines whether the subgroup ID RANGroupID is matched with the pre-stored device ID RANDeviceID. Under the condition that according to the above naming rule, the RANDeviceID includes related information of the RANGroupID to which the terminal device 110 belongs, corresponding bits of the RANGroupID and the RANDeviceID may be compared with each other (e.g., the bits other than 0 in the RANGroupID), so as to determine whether the terminal device 110 belongs to the subgroup represented by the RANGroupID. Alternatively, the terminal device 110 may determine whether the obtained RANGroupID is matched with the RANDeviceID of itself according to the corresponding relation between the RANGroupID and the RANDeviceID, e.g., determining whether the obtained RANGroupID is the same as the pre-stored RANGroupID.

Next, in S4400, if the subgroup ID RANGroupID is matched with the device ID RANDeviceID, the terminal device 110 responds to the group paging message.

Since an adaptive grouping of the terminal devices 110 has been carried out in the access network to achieve an appropriate number of terminals in the subgroup, the response from the terminal devices 110 can be more effective.

According to an embodiment of the present invention, if monitoring the paging channel, the terminal device 110 can monitor at the paging timing calculated from the CNGroupID. The terminal device 110 may acquire the CNGroupID allocated by the core network device 130 via the access network device 110 in the process of startup and login. Alternatively, the terminal device 110 can also acquire, from the RANGroupID or the RANDeviceID meeting the naming rule, the CNGroupID mapped to the predetermined bits of the RANGroupID or the RANDeviceID.

Figure 6:
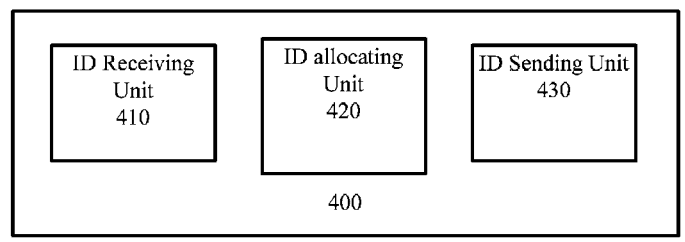
FIG. 6 is a schematic block diagram which illustrates an example of a communication device according to an embodiment of the present invention.

A communication device capable of implementing the embodiments of the present invention will be described as follows. FIG. 6 is a schematic block diagram which illustrates an example of a communication device 400 according to an embodiment of the present invention. The communication device 400 may be corresponding to the access network device 120 as illustrated in FIG. 1, and its components can perform the procedures of the method 2000 as illustrated in FIG. 2, respectively. For example, the communication device 400 may be a device of the base station system, e.g., an eNB in the LTE, a NodeB in the UMTS, a BTS or a BSC in the GSM, etc. As illustrated in FIG. 6, the communication device 400 includes an ID receiving unit 410, an ID allocating unit 420 and an ID sending unit 430.

The ID receiving unit 410 receives a group ID of a group of group-paged objects allocated to the terminal device 110 by the core network device 130. The group of group-paged objects includes one or more subgroups. The ID allocating unit 420 allocates a device ID to the terminal device 110, wherein the device ID includes information of a subgroup ID of a subgroup to which the terminal device belongs. The device ID may be allocated in the process as described with reference to FIG. 2. For example, the ID allocating unit 420 may map a group ID, a cell ID, a subgroup ID and a specific ID into the device ID, respectively.

Next, the ID sending unit 430 sends the allocated device ID to the terminal device.

The concrete operations and functions of the components of the communication device 400 may be similar to those as described with reference to FIG. 2, which are omitted herein in order to avoid repetition.

Figure 7:
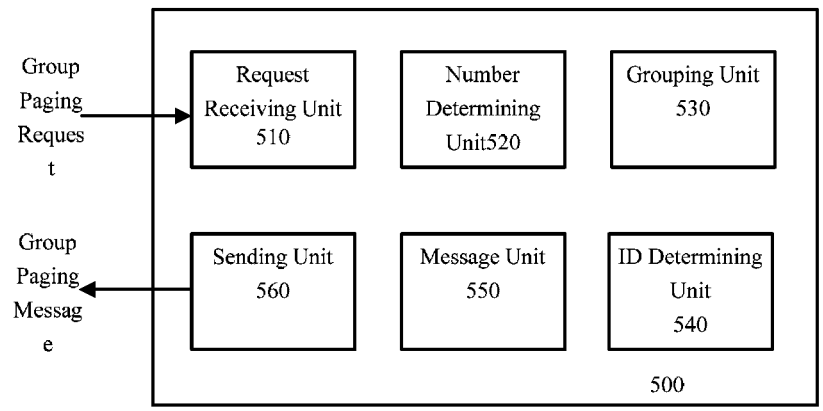
FIG. 7 is a schematic block diagram which illustrates an example of a communication device according to an embodiment of the present invention.

FIG. 7 is a schematic block diagram which illustrates an example of a communication device 500 according to an embodiment of the present invention. The communication device 500 may be corresponding to the access network device 120 in FIG. 1. For example, the communication device 500 may be a device of the base station system, e.g., an eNB in the LTE, a NodeB in the UMTS, a BTS or a BSC in the GSM, etc. The components of the communication device 500 can implement the method for paging group 2000 in FIG. 3.

Specifically, the communication device 500 may include a request receiving unit 510, a number determining unit 520, a grouping unit 530, an ID determining unit 540, a message unit 550 and a sending unit 560. In which, the request receiving unit 510 receives a group paging request from the core network device 130. As mentioned above, the group paging request includes the group ID CNGroupID of a group of group-paged objects. The number determining unit 520 determines the number of the terminal devices 110 belonging to the group of group-paged objects in the cell supported by the access network device 120, according to the group ID CNGroupID.

The grouping unit 530 classifies the terminal devices 110 into one or more subgroups according to the number of the terminal devices 110 determined by the number determining unit 520. Next, the ID determining unit 540 determines the subgroup ID RANGroupID of each subgroup.

The message unit 550 generates a group paging message carrying the subgroup ID RANGroupID, and then the sending unit 560 sends the group paging message generated by the message unit 550.

In the embodiment of the present invention, through the hierarchical grouping, not only a grouping is carried out in the core network hierarchy, but also the terminals in each cell are further grouped in the access network hierarchy, so that the number of terminals in the subgroup is appropriate, the resources are allocated more flexibly and reasonably, and the improved group paging response solution is more effective.

Figure 8:
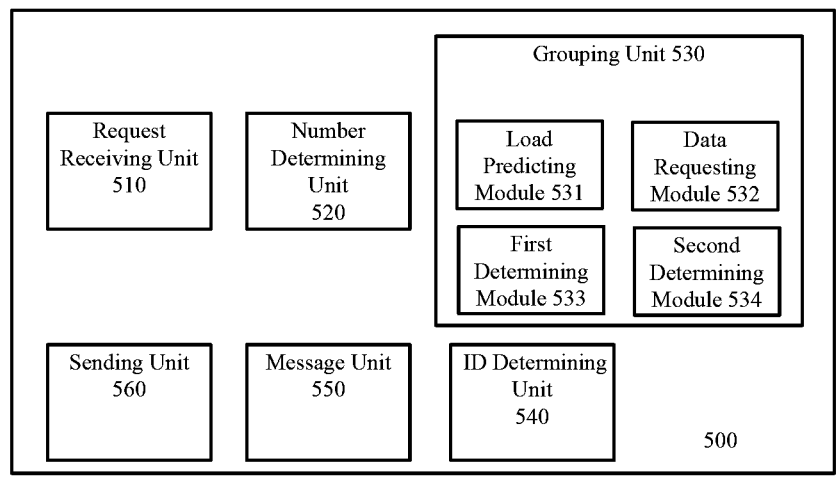
FIG. 8 is a schematic diagram which illustrates an exemplary structure of a communication device according to an embodiment of the present invention.

The communication device 500 can also group the subgroups according to the above described naming rule and allocation strategy. FIG. 8 is a schematic diagram which illustrates an exemplary structure of the communication device 500 according to an embodiment of the present invention.

As illustrated in FIG. 8, the grouping unit 530 of the communication device 500 may include a load predicting module 531, a data requesting module 532, a first determining module 533 and a second determining module 534. In which, the load predicting module 531 acquires load data of a cell, such as, but not limited to, the Tsetup, the Tdata or the Nconn. The data requesting module 532 requests service subscription data from the core network device 130 according to the group ID CNGroupID. The service subscription data includes QoS related data, such as, but not limited to, the Tmax.

The first determining module 533 determines the size of a classifiable subgroup, such as a maximum number of terminals included in the subgroup, according to the load data and the service subscription data. The second determining module 534 determines the number of the subgroups according to the size of the subgroup and the number of the terminal devices determined by the number determining unit 520.

In addition, the ID determining unit 540 may determine corresponding subgroup ID from the device ID of the terminal device 110, based on the determined size and number of the subgroups. In conclusion, since the device ID RANDeviceID may include information of the subgroup ID RANGroupID of a subgroup to which the terminal device 110 may be allocated, the ID determining unit 540 can determine the subgroup into which the terminal device 110 shall be classified, based on the size and number of the subgroups.

The concrete operations and functions of the components of the communication device 500 may be similar to those as described with reference to FIGS. 3-4, which are omitted herein in order to avoid repetition.

Figure 9:
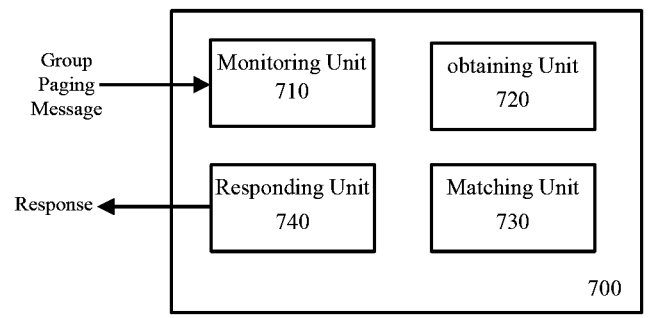
FIG. 9 is a schematic block diagram which illustrates an example of a communication device according to an embodiment of the present invention.

FIG. 9 is a schematic block diagram which illustrates a communication device 700 according to another embodiment of the present invention. The communication device 700 may be corresponding to the terminal device 110 in FIG. 1, and the components thereof can implement the method for paging group 4000 in FIG. 5.

Specifically, the communication device 700 may include a monitoring unit 710, an obtaining unit 720, a matching unit 730 and a responding unit 740. In which, the monitoring unit 710 monitors a paging channel to receive a group paging message generated by the access network device 120, wherein the group paging message carries the subgroup ID RANGroupID determined by the access network device 120 according to S2300 and S2400 of the method 2000 as illustrated in FIG. 3. The monitoring unit 710 may calculate a paging timing of a group of group-paged objects according to the CNGroupID, and monitors the paging channel at the paging timing. The obtaining unit 720 obtains the subgroup ID RANGroupID from the group paging message.

Next, the matching unit 730 may determine whether the subgroup ID RANGroupID is matched with a pre-stored device ID RANDeviceID, in various manners as described in S4200 of the method 4000.

The responding unit 740 responds to the group paging message, if the RANGroupID is matched with the RANDeviceID.

Since an adaptive grouping of the communication devices 700 (i.e., terminal devices) has been carried out in the access network to achieve an appropriate number of terminals in the subgroup, the response from the communication devices 700 can be more effective In addition, the communication device 700 according to the embodiment of the present invention can also implement various processes of the method as illustrated in FIG. 4, which are omitted herein in order to avoid repetition.

A person skilled in the art will realize that the units and algorithm steps in respective examples of the embodiments disclosed herein can be implemented by electronic hardware, computer software or a combination thereof. To clearly describe the interchangeability between the hardware and the software, compositions and steps of the examples have been generally described in functions as above. Whether those functions are performed by hardware or software depends on the specific application and the designed constraint condition of the technical solution. For each specific application, a person skilled in the art may implement the described functions in different methods, and the implementation shall not be regarded as going beyond the scope of the present invention.

A person skilled in the art will clearly understand that, in order for convenient and concise descriptions, the concrete working processes of the above system, device and units may refer to corresponding processes in the above method embodiments, which are not repeated herein.

To be noted, in the above embodiment of the base station, the included respective units are just classified according to the functional logics, but they are not limited thereto so long as corresponding functions can be implemented. In addition, the specific names of the respective units are also only used to distinguish the units from each other, rather than limiting the protection scope of the present invention.

In the embodiments provided by the present application, it shall be appreciated that the disclosed system, device and method may be implemented in other ways. For example, the above device embodiments are just exemplary. For example, the unit division is just a logical function division, and other division mode may be used in the implementation, e.g., multiple units or components may be combined or integrated into another system, or some features may be omitted or not executed. Another point is that the displayed or discussed mutual coupling, direct coupling or communication connection may be implemented through indirect coupling or communication connection between some interfaces, devices or units in electrical, mechanical or other forms.

The units described as separate parts may be or may not be physically separated, and the parts displayed as units may be or may not be physical units, i.e., they may be located at the same place or distributed to at least two network elements. The object of the solution of the embodiment may be achieved by selecting parts or all of units upon actual demand.

In addition, various functional units in the embodiments of the present invention may be integrated into one processing unit, or existed as individual physical units, or two or more units may be integrated into one unit. The integrated units may be implemented in the form of hardware or software functional units.

If the integrated units are implemented in the form of software functional units and sold or used as individual products, they may be stored in a computer readable access medium. Based on such understanding, the technical solution of the present invention substantively, a part thereof making a contribution to the prior art, or the whole or a part of the technical solution, may be reflected in the form of software product which is stored in a storage medium, including several instructions to enable a computer device (e.g., personal computer, server, network facility, etc.) to execute all or a part of the steps of the methods of the respective embodiments. The storage medium includes various mediums capable of storing the program codes, such as U-disc, mobile hard disc, Read-Only Memory (ROM), Random Access Memory (RAM), magnetic disc, optical disc, etc.

The above descriptions are just preferred embodiments of the present invention, and the protection scope of the present invention is not limited thereto. Any change or substitution easily conceivable to a person skilled in the art within the technical scope disclosed by the present invention shall fall within the protection scope of the present invention. Therefore, the protection scope of the present invention shall be determined by the protection scope of the claims.

What is claimed is:

1. A method for allocating an identification (ID) to a terminal device to facilitate group paging, comprising:
    receiving, by a network device, a group ID for the terminal device, wherein the group ID corresponds to a group of group-paged objects in a cell supported by an access network device, wherein the group ID is allocated by a core network device, and wherein the group of group-paged objects comprises one or more subgroups;
    allocating, by the network device, a device ID or a user ID for the terminal device, wherein the device ID or the user ID comprises information of a subgroup ID of a subgroup to which the terminal device belongs; and
    sending, by the network device, the allocated device ID or user ID to the terminal device;
    wherein the number of subgroups of the one or more subgroups is determined by the network device according to the number of the terminal devices belonging to the group of group-paged objects and the subgroup sizes of the one or more subgroups, wherein the subgroup sizes of the one or more subgroups are determined by:
        acquiring load data of the cell;
        requesting service subscription data from the core network device according to the group ID; and
        determining subgroup size based on the load data and the service subscription data.

2. The method according to claim 1, wherein the device ID or the user ID further comprises the group ID for the terminal device.

3. The method according to claim 2, wherein the allocating the device ID or the user ID for the terminal device comprises:
    mapping the group ID to a bit corresponding to the device ID or the user ID; and
    storing mapping information.

4. The method according to claim 1, wherein the allocating the device ID or the user ID for the terminal device comprises at least one of:
    mapping the group ID into the device ID or the user ID;
    mapping a cell ID of a cell to which the terminal device belongs into the device ID or the user ID;
    mapping the subgroup ID of the subgroup to which the terminal device belongs into the device ID or the user ID; or
    mapping a specific ID of the terminal device into the device ID or the user ID.

5. A method for group paging, comprising:
    receiving, by a network device, a group paging request from a core network device, wherein the group paging request comprises a group identification (ID) of a group of group-paged objects;

determining, by the network device, the number of terminal devices belonging to the group of group-paged objects in a cell supported by an access network device according to the group ID;
grouping, by the network device, the terminal devices into one or more subgroups based on the number of terminal devices;
determining, by the network device, a subgroup ID corresponding to a subgroup of the one or more subgroups;
generating, by the network device, a group paging message carrying the subgroup ID; and
sending, by the network device, the group paging message;
wherein grouping the terminal devices into one or more subgroups based on the number of terminal devices comprises:
acquiring load data of the cell;
requesting service subscription data from the core network device according to the group ID;
determining subgroup size based on the load data and the service subscription data; and
determining the number of subgroups based on the determined subgroup size and the number of terminal devices.

6. The method according to claim 5, wherein the terminal devices each have a device ID or a user ID, the device ID or the user ID comprising information of a subgroup ID of a subgroup to which the corresponding terminal device belongs, and
wherein determining the subgroup ID comprises determining, based on the determined subgroup size and the determined number of the subgroups, the subgroup ID from the device ID or the user ID.

7. A method for group paging, comprising:
receiving, by a terminal device, a group paging message generated by an access network device via monitoring a paging channel, wherein the group paging message carries a subgroup identification (ID) determined by the access network device;
obtaining, by the terminal device, the subgroup ID from the group paging message;
determining, by the terminal device, whether the subgroup ID matches a stored device ID or user ID; and
responding, by the terminal device, to the group paging message in response to determining that the subgroup ID matches the stored device ID or user ID;
wherein a number of subgroups is determined by a network device according to the number of the terminal devices belonging to a group of group-paged objects in a cell supported by an access network device according to a group ID and subgroup size, wherein the subgroup size is determined by:
acquiring load data of the cell;
requesting service subscription data from a core network device according to the group ID; and
determining subgroup size based on the load data and the service subscription data.

8. The method according to claim 7, wherein the stored device ID or user ID comprises information of a subgroup ID of a subgroup to which the terminal device belongs.

9. A communication device, comprising:
a receiver configured to receive a group identification (ID) for a terminal device, wherein the group ID corresponds to a group of group-paged objects in a cell supported by an access network device, wherein the group ID is allocated by a core network device, and wherein the group of group-paged objects comprises one or more subgroups;
a processor configured to allocate a device ID or a user ID for the terminal device, wherein the device ID or the user ID comprises information of a subgroup ID of a subgroup to which the terminal device belongs; and
a transmitter configured to send the allocated device ID or user ID to the terminal device;
wherein the number of subgroups of the one or more subgroups is determined by a network device according to the number of the terminal devices belonging to the group of group-paged objects and the subgroup sizes of the one or more subgroups, wherein the subgroup sizes of the one or more subgroups are determined by:
acquiring load data of the cell;
requesting service subscription data from the core network device according to the group ID; and
determining subgroup size based on the load data and the service subscription data.

10. The communication device according to claim 9, wherein the device ID or the user ID further comprises the group ID for the terminal device.

11. The communication device according to claim 10, wherein the processor is further configured to map the group ID to a bit corresponding to the device ID or the user ID; and store mapping information.

12. The communication device according to claim 9, wherein the processor is further configured to map at least one of: the group ID, a cell ID of a cell to which the terminal device belongs, the subgroup ID of the subgroup to which the terminal device belongs, or a specific ID of the terminal device, into the device ID or the user ID.

13. A communication device, comprising:
a receiver configured to receive a group paging request from a core network device, wherein the group paging request comprises a group identification (ID) of a group of group-paged objects;
a processor configured to determine the number of terminal devices belonging to the group of group-paged objects in a cell supported by an access network device according to the group ID; group the terminal devices into one or more subgroups based on the number of terminal devices; determine a subgroup ID corresponding to a subgroup of the one or more subgroups; and generate a group paging message carrying the subgroup ID; and
a transmitter configured to send the group paging message;
wherein the processor is further configured to acquire load data of the cell; request service subscription data from the core network device according to the group ID; determine subgroup size based on the load data and the service subscription data; and determine the number of subgroups based on the determined subgroup size and the number of terminal devices.

14. The communication device according to claim 13, wherein the terminal devices each have a device ID or a user ID, the device ID or the user ID comprising information of a subgroup ID of a subgroup to which the corresponding terminal device belongs; and
wherein the processor is further configured to determine, based on the determined subgroup size and the determined number of subgroups, the subgroup ID from the device ID or the user ID.

15. A communication device, comprising:
a receiver configured to receive a group paging message generated by an access network device via monitoring a paging channel, wherein the group paging message carries a subgroup identification (ID) determined by the access network device;
a processor configured to obtain the subgroup ID from the group paging message and determine whether the subgroup ID matches a stored device ID or user ID; and
a transmitter configured to send a response signal responding to the group paging message if the subgroup ID matches the stored device ID or user ID;
wherein a number of subgroups is determined by a network device according to the number of the terminal devices belonging to a group of group-paged objects in a cell supported by an access network device according to a group ID and subgroup size, wherein the subgroup size is determined by:
acquiring load data of the cell;
requesting service subscription data from a core network device according to the group ID; and
determining subgroup size based on the load data and the service subscription data.

16. The communication device according to claim 15, wherein the stored device ID or user ID comprises information of a subgroup ID of a subgroup to which the communication device belongs.

\* \* \* \* \*